United States Patent
Song et al.

(10) Patent No.: US 12,368,010 B2
(45) Date of Patent: Jul. 22, 2025

(54) WHOLE-PROCESS DIGITAL PROCESSING SYSTEM OF MAGNETIC SWITCH SENSOR AND PROCESSING METHOD THEREOF

(71) Applicant: Sanqiaohui (Foshan) New Material Co., Ltd., Foshan (CN)

(72) Inventors: Tongcui Song, Foshan (CN); Kewen Long, Foshan (CN); Shuiyan Song, Foshan (CN); Lizhong Zhao, Foshan (CN); Xuefeng Zhang, Foshan (CN)

(73) Assignee: Sanqiaohui (Foshan) New Material Co., Ltd., Foshan (CN)

( * ) Notice: Subject to any disclaimer, the term of this patent is extended or adjusted under 35 U.S.C. 154(b) by 551 days.

(21) Appl. No.: 17/714,645

(22) Filed: Apr. 6, 2022

(65) Prior Publication Data
US 2023/0146734 A1 May 11, 2023

(51) Int. Cl.
*H01H 11/00* (2006.01)
*G05B 19/418* (2006.01)
*H01H 36/00* (2006.01)

(52) U.S. Cl.
CPC ........ *H01H 11/005* (2013.01); *H01H 36/002* (2013.01); *G05B 19/41865* (2013.01); *G05B 19/41875* (2013.01); *G05B 2219/32368* (2013.01); *Y10T 29/49105* (2015.01)

(58) Field of Classification Search
CPC ............... H01H 11/005; H01H 36/002; Y10T 29/49105; G05B 19/41865; G05B 19/41875; G05B 2219/32368
See application file for complete search history.

(56) References Cited

U.S. PATENT DOCUMENTS

| | | | |
|---|---|---|---|
| 2005/0102823 A1* | 5/2005 | Kim | H01H 11/0056 29/874 |
| 2016/0196520 A1* | 7/2016 | Yamashita | G05B 19/41865 705/7.13 |

FOREIGN PATENT DOCUMENTS

| | | |
|---|---|---|
| CN | 202022152308.1 | 6/2021 |
| CN | 202022152442.1 | 6/2021 |
| JP | 2014229874 A * | 12/2014 |

OTHER PUBLICATIONS

Van Beek et al, "Mechanically Sorting Electronic Components from Discarded Printed Circuit Boards to Enable Recycling of Critical Raw Materials," 2024 Electronics Goes Green 2024+ (EGG), Berlin, Germany, 2024, pp. 1-6. (Year: 2024).*

* cited by examiner

*Primary Examiner* — A. Dexter Tugbang
(74) *Attorney, Agent, or Firm* — Jose Cherson Weissbrot (57) ABSTRACT

A processing system includes a master control module, an order module, a magnetic sensitive element sorting module, a pin processing module, a lead processing module, a pin lead welding module, a casing module and a glue injecting module, wherein the magnetic sensitive element sorting module is configured to grade and screen magnetic sensitive elements, the pin processing module is configured to process pins of magnetic sensitive elements, the lead processing module is configured to process wires into leads, the pin lead welding module is configured to weld leads on the pins of magnetic sensitive elements to form sensing elements, the casing module is configured to sleeve the sensing elements into the accommodating cavity of a shell, and the glue injecting module is configured to inject glue into the accommodating cavity of the shell to encapsulate the sensing elements and form magnetic switch sensors.

20 Claims, 2 Drawing Sheets

WHOLE-PROCESS DIGITAL PROCESSING SYSTEM OF MAGNETIC SWITCH SENSOR AND PROCESSING METHOD THEREOF

TECHNICAL FIELD

The present disclosure relates to the technical field of magnetic sensitive element processing, in particular to a whole-process digital processing system of a magnetic switch sensor and a processing method thereof.

BACKGROUND ART

A magnetic switch sensor is made of a magnetic reed switch which is connected, shaped and encapsulated by leads. A magnetic reed switch is a magnetic sensitive element, and it is a glass package with metal pins. A magnetic sensitive element refers to a sensing element whose characteristic parameters change with the change of external magnetic quantity. In the processing of existing magnetic switch sensors, the magnetic sensitive elements are usually measured and screened first, stored separately according to the quality grade, and then manually transferred to the pin processing device for processing when processing is needed. Moreover, the processes of pin processing, lead processing, pin lead welding, casing, glue injecting and so on are all independent, and the whole-process digital and automatic processing cannot be achieved, so that in the whole process, the automation is low, the labor cost is high, and the processing process cannot be automatically controlled according to the order.

SUMMARY

The purpose of the present disclosure is to propose a whole-process digital processing system of a magnetic switch sensor and a processing method thereof, aiming at solving the technical problems in the prior art that the production process automation of a magnetic switch sensor is low, the labor cost is high, and the processing process cannot be automatically controlled according to the order.

In order to achieve the above purpose, the present disclosure provides a whole-process digital processing system of a magnetic switch sensor, comprising a master control module, an order module, a magnetic sensitive element sorting module, a pin processing module, a lead processing module, a pin lead welding module, a casing module and a glue injecting module;

wherein the order module is in data connection with the master control module and is configured to convey order information to the master control module;

the master control module is configured to control the operation of the magnetic sensitive element sorting module, the pin processing module, the lead processing module, the pin lead welding module, the casing module and the glue injecting module;

the magnetic sensitive element sorting module is configured to grade and screen magnetic sensitive elements, the pin processing module is configured to process pins of magnetic sensitive elements, the lead processing module is configured to process wires into leads, the pin lead welding module is configured to weld leads on the pins of magnetic sensitive elements to form sensing elements, the casing module is configured to sleeve the sensing elements into the accommodating cavity of a shell, and the glue injecting module is configured to inject glue into the accommodating cavity of the shell to encapsulate the sensing elements and form magnetic switch sensors.

Preferably, the whole-process digital processing system of a magnetic switch sensor further comprises a database module and a purchasing information output module which are in data connection with the master control module, respectively, wherein the database module is configured to convey inventory information to the master control module, the master control module calculates purchasing information in combination with the order information and the inventory information and conveys the purchasing information to the purchasing information output module, the purchasing information output module is configured to output purchasing information, and the inventory information comprises magnetic sensitive element inventory data, wire inventory data, shell inventory data and colloidal particle inventory data.

Preferably, the whole-process digital processing system of a magnetic switch sensor further comprises a testing module and a grading module which are in data connection with the master control module, respectively, wherein the testing module is configured to test the processed magnetic switch sensors, and the grading module is configured to grade the tested magnetic switch sensors.

Preferably, both the testing module and the grading module comprise a feedback module, the feedback module is in data connection with the master control module and is configured to feed back the test result and the grading result to the master control module; the master control module adjusts the operation of the magnetic sensitive element sorting module, the pin processing module, the lead processing module, the pin lead welding module, the casing module and the glue injecting module in combination with the order information, the test result and the grading result, so as to process all orders according to the order information.

Preferably, the master control module comprises a machine learning module, the machine learning module is configured to carry out machine learning and build a machine learning model in combination with the order information, the test result and the grading result, and the master control module combines and adjusts subsequent orders according to the machine learning model.

Preferably, the magnetic sensitive element sorting module comprises a suspension module, a pick-up module and a measuring and screening module, the suspension module is configured to fix the magnetic sensitive element, and the pick-up module is configured to take out the magnetic sensitive element from the suspension module and convey the magnetic sensitive element to the measuring and screening module, and the measuring and screening module is configured to measure and screen the magnetic sensitive element.

Preferably, the magnetic sensitive element sorting module further comprises a placing module, a positioning module and a waste collecting module; the placing module is configured to place the magnetic sensitive elements taken out by the pick-up module, the positioning module is configured to position the magnetic sensitive elements on the placing module, and the waste collecting module is located behind the measuring and screening module and is configured to collect the unqualified magnetic sensitive elements after being measured and screened.

Preferably, the suspension module comprises two magnet boxes which are parallel to each other and provided at intervals, permanent magnets are provided in the magnet boxes, and the magnetism inside the permanent magnets is in an irregular and uneven state.

Preferably, the whole-process digital processing system of a magnetic switch sensor further comprises a sorting and conveying module which is in data connection with the master control module, wherein the sorting and conveying module is configured to convey the magnetic sensitive element sorted by the magnetic sensitive element sorting module to the pin processing module; the sorting and conveying module comprises at least two conveying belts, each conveying belt is configured to convey magnetic sensitive elements classified into different grades after being sorted, and each conveying belt is provided with a plurality of neck stations for erecting magnetic sensitive elements.

Preferably, the pin processing module comprises a positioning structure, a shearing structure and a bending structure; the positioning structure is configured to position the magnetic sensitive element, the shearing structure is configured to shear the pins of the magnetic sensitive element, and the bending structure is configured to bend the pins of the magnetic sensitive element.

On the other hand, the present disclosure also provides a whole-process digital processing method of a magnetic switch sensor, comprising the following steps:

step 1, an order module receives order information;

step 2, a master control module 1 controls a magnetic sensitive element sorting device to take out, measure and screen the magnetic sensitive elements according to the order information, so as to classify the magnetic sensitive elements into qualified products and unqualified products;

step 3, the magnetic sensitive elements belonging to qualified products are conveyed to the pin processing device through a sorting and conveying device, and a pin processing device processes the magnetic sensitive elements according to the order information;

step 4, a lead processing device processes a wire into a lead according to the order information;

step 5, the magnetic sensitive element processed in step 3 and the lead processed in step 4 are conveyed to a pin lead welding device, and the pin lead welding device welds the lead on the pin of the magnetic sensitive element to form a sensing element;

step 6, the sensing element is conveyed to the casing device, and the casing device sleeves the sensing element into the accommodating cavity of a shell;

step 7, the shell sleeved with the sensing element is conveyed to a glue injecting device, and the glue injecting device injects glue into the accommodating cavity of the shell to encapsulate the sensing elements and form magnetic switch sensors.

Preferably, step 1-2 is further included between step 1 and step 2: a database module conveys inventory information to the master control module, the master control module calculates purchasing information according to the order information and the inventory information and conveys the purchasing information to the purchasing information output module, and then the purchasing information output module sends the purchase information to the purchasing staff, and the inventory information comprises magnetic sensitive element inventory data, wire inventory data, shell inventory data and colloidal particle inventory data.

Preferably, the whole-process digital processing method of a magnetic switch sensor further comprises the following steps:

step 8, a testing device tests the magnetic switch sensor processed in step 7;

step 9, a grading device grades the magnetic switch sensor tested in step 8.

Preferably, in step 8, the testing device feeds back the test result to the master control module; in step 9, the grading device feeds back the grading result to the master control module; the master control module adjusts the operation of the magnetic sensitive element sorting device, the pin processing device, the lead processing device, the pin lead welding device, the casing device and the glue injecting device in combination with the order information, the test result and the grading result, so as to process all orders according to the order information.

Preferably, the machine learning module in the master control module carries out machine learning and builds a machine learning model in combination with the order information, the test result and the grading result, and combines and adjusts subsequent orders according to the machine learning model.

Preferably, the magnetic sensitive element sorting device comprises a suspension device, a pick-up device and a measuring and screening device, wherein step 2 comprises:

step 2.1, the master control module receives the order information and controls the pick-up device to take out the magnetic sensitive elements from the suspension device in sequence;

step 2.2, the measuring and screening device measures and screens the magnetic sensitive elements, and classifies the magnetic sensitive elements into qualified products and unqualified products.

Preferably, the magnetic sensitive element sorting device further comprises a placing device, a positioning device and a waste collecting device; the following steps are further included between step 2.1 and step 2.2:

step 2.1-1, the pick-up device places the magnetic sensitive element in the placing device;

step 2.1-2, the positioning device positions the magnetic sensitive element in the placing device;

step 2.2 is followed by step 2.3, if the magnetic sensitive element fails after being measured and screened, the unqualified magnetic sensitive element flows into the waste collecting device.

Preferably, in step 2.2, the qualified products are divided into n grades, where n≥2; in step 3, the sorting and conveying device comprises m conveying belts, wherein m≥n; the qualified products of each grade are conveyed to the pin processing device by at least one conveying belt correspondingly.

Preferably, in step 2, the sorting and conveying device further comprises a switching mechanism, and the switching mechanism is configured to switch the conveying belt so that the corresponding conveying belt is switched to the output end of the measuring and screening device to hold the graded magnetic sensitive element.

Preferably, each conveying belt is provided with a plurality of neck stations for erecting magnetic sensitive elements.

Preferably, the suspension device comprises two magnet boxes which are parallel to each other and provided at intervals, permanent magnets are provided in the magnet boxes, and the magnetism inside the permanent magnets is in an irregular and uneven state.

Preferably, in step 1, the order information comprises order number, number of workpieces, order grade and processing demand; the processing demand includes whether to shear the pin, whether to bend the pin, the shearing length of the pin and the length of the lead;

in step 3, the pin processing device comprises a shearing structure and a bending structure 43, the shearing structure is configured to shear the pin of the magnetic sensitive element, and the bending structure is configured to bend the pin of the magnetic sensitive element;

in step 4, the lead processing device peels the wire and cuts out the lead from the wire.

The present disclosure relates to a whole-process digital processing system of a magnetic switch sensor and a processing method thereof, at least having the following beneficial effects. The order data is conveyed to the master control module through the order module, and then the master control module is used to control the operation of the magnetic sensitive element sorting module, the pin processing module, the lead processing module, the pin lead welding module, the casing module and the glue injecting module, so as to realize automatic production and digital processing. The efficiency of the whole processing process is higher, the labor cost is lower, and the production process is more optimized. Furthermore, the processing process is based on the order, which avoids the need to sort out magnetic sensitive elements and cut out leads before the order is received. Therefore, the material management is more convenient and easier. At the same time, the material waste caused by subsequent orders in the preparation of premise can also be avoided. There is better coordination between production and order, and manufacturing is smarter.

BRIEF DESCRIPTION OF THE DRAWINGS

In order to more clearly explain the embodiments of the present disclosure or the technical solutions in the prior art, the drawings that need to be used in the description of the embodiments or the prior art will be briefly introduced hereinafter. Obviously, the drawings in the following description are only some embodiments of the present disclosure. For those skilled in the art, other drawings can be obtained according to the structures shown in these drawings without creative efforts.

In the figures: 1—master control module, 2—order module, 3—magnetic sensitive element sorting module, 31—suspension module, 32—pick-up module, 33—measuring and screening module, 34—placing module, 35—positioning module, 36—waste collecting module, 4—pin processing module, 41—positioning structure, 42—shearing structure, 43—bending structure, 5—lead processing module, 6—pin lead welding module, 7—casing module, 8—glue injecting module, 9—database module, 10—purchasing information output module, 11—testing module, 12—grading module, 13—sorting and conveying module, 14—packaging module.

The realization, functional features and advantages of the present disclosure will be further explained with reference to the attached drawings in combination with the embodiments.

DETAILED DESCRIPTION OF THE EMBODIMENTS

The technical solutions in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiments in the present disclosure, all other embodiments obtained by those skilled in the art without creative efforts are within the scope of the present disclosure.

It should be noted that if there are directional indications (such as up, down, left, right, front, back, . . . ) in the embodiments of the present disclosure, the directional indications are only used to explain the relative positional relationship, movement situation, etc. among components in a specific posture (as shown in the attached figures), and if the specific posture changes, the directional indications will change accordingly.

In addition, if there are descriptions of "first" and "second" in the embodiments of the present disclosure, the descriptions of "first" and "second" are only used for descriptive purposes, but cannot be understood as indicating or implying their relative importance or implicitly indicating the number of indicated technical features. Therefore, the features defined with "first" and "second" can explicitly or implicitly include at least one of the features. In addition, the technical solutions of various embodiments can be combined with each other, but it must be based on the realization by those skilled in the art. When the combination of technical solutions is contradictory or impossible, it should be considered that the combination of such technical solutions does not exist and is not within the scope of protection of the present disclosure.

Embodiment 1

Figure 1:
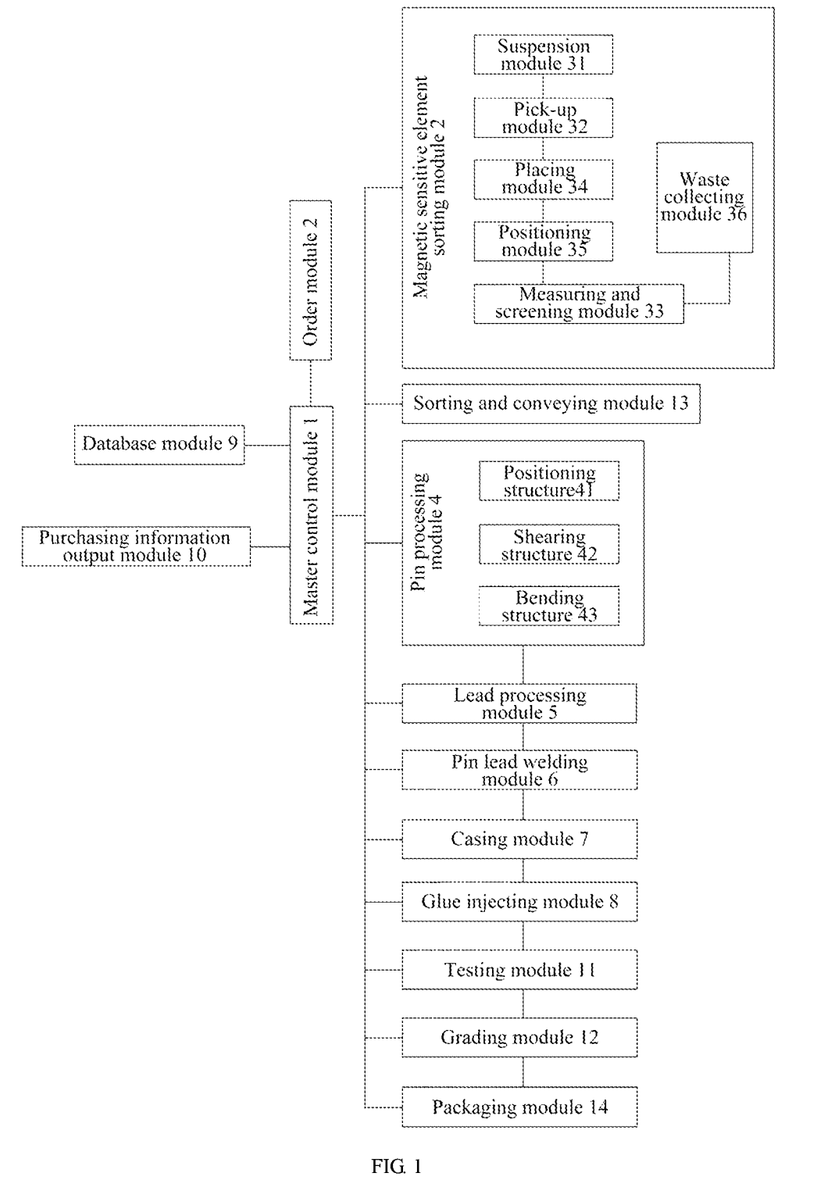
FIG. 1 is a schematic diagram of a frame structure of a processing system according to the present disclosure.

As shown in FIG. 1, the whole-process digital processing system of a magnetic switch sensor comprises a master control module 1, an order module 2, a magnetic sensitive element sorting module 3, a pin processing module 4, a lead processing module 5, a pin lead welding module 6, a casing module 7 and a glue injecting module 8; wherein the order module 2 is in data connection with the master control module 1 and is configured to convey order information to the master control module 1; the master control module 1 is configured to control the operation of the magnetic sensitive element sorting module 3, the pin processing module 4, the lead processing module 5, the pin lead welding module 6, the casing module 7 and the glue injecting module 8; the magnetic sensitive element sorting module 3 is configured to grade and screen magnetic sensitive elements, the pin processing module 4 is configured to process pins of magnetic sensitive elements, the lead processing module 5 is configured to process wires into leads, the pin lead welding module 6 is configured to weld leads on the pins of magnetic sensitive elements to form sensing elements, the casing module 7 is configured to sleeve the sensing elements into the accommodating cavity of a shell, and the glue injecting module 8 is configured to inject glue into the accommodating cavity of the shell to encapsulate the sensing elements and form magnetic switch sensors.

A magnetic sensitive element mainly refers to a magnetic reed switch. The order module 2 is configured to input or select order information such as order serial number, number of workpieces, order grade (quality requirement), processing demand, etc. The order information can also include customer name, product code, specification and model, delivery date, etc. Workers can input the order information into the order module 2, or select the corresponding options in the order module 2 according to the order demand. The order information comprises order serial number (such as PO1, PO2, PO3 . . . ), number of workpieces (such as 1,000 workpieces in PO1), order grade (such as if PO1 has high quality requirements, workpieces of ABC quality grade need to be used for processing) and processing demand (such as 500 workpieces in PO1 need to cut left and right pins, 500 workpieces need to cut a left pin and bend a right pin, and the shearing length is 10 mm). The order module 2 can input or select a variety of order information, so that the processing collaboration system can produce orders with various requirements, and the degree of completion and matching of orders is higher.

The magnetic sensitive element sorting module 3 measures and screens the magnetic sensitive elements in batches one by one to grade each magnetic sensitive element according to the quality grade, so that the graded magnetic sensitive elements can be used for production in different orders. The pin processing module 4 processes the pins of the magnetic sensitive element according to the order information to meet the processing demand of the corresponding order. The lead processing module 5 specifically comprises a shearing structure or a peeling structure. The wires can be bare wires or insulated wires. Bare wires have no insulation layer, including copper, aluminum flat wires, overhead stranded wires and various profiles. Insulated wires are wires formed by wrapping conductive wires with insulation layers. The lead processing module 5 is configured to process wires into leads. If bare wires are processed into leads, the lead processing module 5 only needs to include a shearing structure, and the shearing structure cuts bare wires into leads with a specific length. If the insulated wires are processed into leads, the lead processing module 5 needs to include a shearing structure and a peeling structure. The peeling structure strips the insulation layer of the insulated wires, and then the shearing structure cuts the insulated wires stripped of the insulation layer into leads with a specific length. Alternatively, the shearing structure cuts out a wire with a specific length from the insulated wire first, and then strips off the insulation layer of the wire. The pin lead welding module 6 welds the leads processed in the lead processing module 5 on the pins of the magnetic sensitive element screened by the magnetic sensitive element sorting module 3 to form a sensing element, and both ends of the magnetic sensitive element are provided with pins, so that the leads are welded on both pins of the magnetic sensitive element. The casing module 7 is configured to place the sensing element into the accommodating cavity of the shell. The shell is made of plastic material. After the shell is molded, the accommodating cavity is reserved. Depending on the position, shape and size of the accommodating cavity, the action that the casing module 7 transfers the sensing element into the accommodating cavity may be different. However, the ultimate goal to be achieved is that the magnetic sensing element in the sensing element is completely located in the accommodating cavity, and both leads extend from the accommodating cavity to the outside, that is, the sensing element is not completely embedded in the accommodating cavity. The glue injecting module 8 is configured to heat the granular glue into molten glue and inject the glue into the accommodating cavity. After the molten glue is cooled and solidified, the glue fixes the sensing element on the shell, and the glue seals the sensing element from being exposed. The glue injecting module 8 is a glue injection molding system, for example, the utility model patent with the application number of CN202022152442.1 and the utility model patent with the application number of CN202022152308.1. The magnetic sensitive element/sensing element/magnetic switch sensor can be transported between various modules by different conveying mechanisms, such as conveying belts, manipulators, etc. In actual production, magnetic sensitive element sorting, pin processing, lead processing, pin lead welding, casing and glue injecting are carried out simultaneously to realize continuous and automatic processing of workpieces. According to the technical scheme, the order data is conveyed to the master control module 1 through the order module 2, and then the master control module 1 is used to control the magnetic sensitive element sorting module 3, the pin processing module 4, the lead processing module 5, the pin lead welding module 6, the casing module 7 and the glue injecting module 8 to process the workpiece, so as to realize automatic production and digital processing. The efficiency of the whole processing process is higher, the labor cost is lower, and the production process is more optimized. Furthermore, the processing process is based on the order, which avoids the need to sort out magnetic sensitive elements and cut out leads before the order is received. Therefore, the material management is more convenient and easier. At the same time, the material waste caused by subsequent orders in the preparation of premise can also be avoided. There is better coordination between production and order, and manufacturing is smarter.

Further, the whole-process digital processing system of a magnetic switch sensor further comprises a database module 9 and a purchasing information output module 10 which are in data connection with the master control module 1, respectively, wherein the database module 9 is configured to convey inventory information to the master control module 1, the master control module 1 calculates purchasing information in combination with the order information and the inventory information and conveys the purchasing information to the purchasing information output module 10, the purchasing information output module 10 is configured to output purchasing information, and the inventory information comprises magnetic sensitive element inventory data, wire inventory data, shell inventory data and colloidal particle inventory data.

The database module 9 stores the inventory information of various materials (magnetic sensitive elements, wires, shells, colloidal particles). After receiving the order information, the master control module 1 can determine whether the inventory meets the order production in combination with the inventory information on the database module 9, and on the premise of meeting the production, the master control module can also calculate the quantity of materials to be purchased in the next step. Under normal circumstances, the inventory of materials can meet the production demand of some orders at a certain time, and the normal production can be ensured by replenishing the inventory regularly or irregularly. In this scheme, the master control module 1 will calculate the purchasing information according to the order information and inventory information, and then inform the technicians responsible for purchasing through the purchasing information output module 10. Therefore, the whole processing system is more comprehensive and intelligent, which can better ensure the smooth progress of the production process.

Further, the whole-process digital processing system of a magnetic switch sensor further comprises a testing module 11 and a grading module 12 which are in data connection with the master control module 1, respectively, wherein the testing module 11 is configured to test the processed magnetic switch sensors, and the grading module 12 is configured to grade the tested magnetic switch sensors.

After the processing system produces the magnetic switch sensor according to the order, in order to ensure the quality of the finished product, the finished product needs to be measured by the testing module 11, and the finished product is graded by the grading module 12. The order grade in the order information indicates the quality requirements of the finished product, and the quality of the finished product mainly depends on the magnetic sensitive element, so that the magnetic sensitive element sorting module 3 first grades the magnetic sensitive element, and then the processing system selects the magnetic sensitive element of the corresponding grade to process the magnetic switch sensor according to the order grade. In the process of processing, because magnetic sensitive elements circulate among modules, and processes such as lead welding, casing, and glue injecting are needed, the final finished product may not meet the quality requirements of the order. Therefore, after processing the magnetic switch sensor, the testing module 11 measures the finished product, and the grading module 12 grades the finished product according to the test result. If the quality demand of the order is met, the finished product is classified as the order. If the order demand is not met, the finished product will be temporarily stored first, and then the finished product will be classified into other orders after other orders come (provided that the quality demand of the order is met) subsequently. If the finished product is unqualified, the finished product will be stored as unqualified product to facilitate subsequent scrapping or rework. Therefore, the testing module 11 is provided to ensure the quality of finished products classified in the production order, so that all finished products can meet the quality requirements of the order. In addition, the design of the grading module 12 can grade the finished products. Even if the finished products do not meet the order demand, the finished products can be used in other orders, which can improve the utilization rate, reduce the production cost and the rejection rate, and make the order production process more collaborative.

Further, both the testing module 11 and the grading module 12 comprise a feedback module, the feedback module is in data connection with the master control module 1 and is configured to feed back the test result and the grading result to the master control module 1; the master control module 1 adjusts the operation of the magnetic sensitive element sorting module 3, the pin processing module 4, the lead processing module 5, the pin lead welding module 6, the casing module 7 and the glue injecting module 8 in combination with the order information, the test result and the grading result, so as to process all orders according to the order information.

The testing module 11 feeds back the test result of finished products to the master control module 1 through the feedback module, and the grading module 12 also feeds back the grading result of finished products to the master control module 1 through its feedback module. If some of the finished products under detection cannot meet the quality requirements of the order being produced, the master control module 1 automatically regulates and controls the magnetic sensitive element sorting module 3, the pin processing module 4, the lead processing module 5, the pin lead welding module 6, the casing module 7 and the glue injecting module 8, so that the production system can produce the finished products that meet the requirements of the order as soon as possible to complete the order as soon as possible. The design of the feedback module can ensure the production efficiency of orders, improve the turnover rate of orders, reduce the overstock of orders and ensure the delivery time. Through the feedback module, the situation of the processing system in the production process can be also known (such as whether there is a problem of high rejection rate in a certain process), which is convenient for the master control module 1 to adjust the production process automatically and flexibly.

Further, the master control module 1 comprises a machine learning module, the machine learning module is configured to carry out machine learning and build a machine learning model in combination with the order information, the test result and the grading result, and the master control module 1 combines and adjusts subsequent orders according to the machine learning model.

The machine learning module combines, compares and calculates the test result and the grading result with the order, so as to judge the matching degree of the final finished product with the order. Assume that the production system produces orders one by one, that is, one order is completed before the next order is produced. After the first order is completed, the machine learning module carry out machine learning in combination with the order information of the first order and the result obtained in such a manner that the testing module 11 and the grading module 12 tests and grades the finished products of the first order. If the first order requires higher quality of finished products, but in the production process of the first order, there are more finished products whose quality cannot meet the requirements of the first order, the master control module 1 can sort the orders with lower quality of finished products to the second or third order, so that the finished products with less high quality produced in the first order can be used in the second or third order. If most of the finished products can meet the quality requirements of the first order in the production process of the first order, the master control module 1 can perform production according to the normal order scheduling without adjusting the order scheduling. Assume that the production system produces multiple orders together, and multiple orders are classified into a production batch. If three orders are taken as a batch, and all three orders have high requirements on the quality of finished products, after the orders of this batch are produced, the machine learning module carries out machine learning according to the information, the test result and the grading result of the three orders. If there are many finished products with less high quality in the first batch during the production process, the master control module 1 autonomously adjusts the order composition of the same batch, so that some orders with higher quality requirements and some orders with less high quality requirements are produced in a unified batch, which improves the utilization rate of finished products, reduces the accumulation of finished products and improves the production efficiency of orders. The machine learning module carries out machine learning and builds a machine learning model. The master control module 1 automatically and flexibly arranges order production and processing according to the machine learning model when dispatching orders, so that the production process is more intelligent, the quality assurance of finished products is effectively provided, the process loss and labor are reduced, the accumulation of finished products is reduced, the turnover efficiency of orders is improved, and the manufacturing efficiency is improved.

Further, the magnetic sensitive element sorting module 3 comprises a suspension module 31, a pick-up module 32 and a measuring and screening module 33, the suspension module 31 is configured to fix the magnetic sensitive element, and the pick-up module 32 is configured to take out the magnetic sensitive element from the suspension module 31 and convey the magnetic sensitive element to the measuring and screening module 33, and the measuring and screening module 33 is configured to measure and screen the magnetic sensitive element.

The suspension module 31 is configured to fix the magnetic sensitive element, specifically, by suspending a batch of magnetic sensitive elements by magnetic attraction. The pick-up module 32 can specifically take the form of a manipulator, which clamps the magnetic sensitive element suspended on the suspension module 31 by the manipulator, and then conveys the magnetic sensitive element to the measuring and screening module 33 by movement (rotating and turning). The measuring and screening module 33 measures the magnetic sensitive element and screens the magnetic sensitive element according to the measurement result. In the process, the pick-up module 32 takes out the next magnetic sensitive element from the suspension module 31 again. Sorting of magnetic sensitive elements can be realized by suspending, picking up, measuring and screening. The suspension module 31 can suspend magnetic sensitive elements in batches, and it is convenient for the pick-up module 32 to grab the magnetic sensitive elements one by one. The pick-up module 32 can realize automatic and mechanized pick-up and transfer. The measuring and screening module 33 can measure and sort magnetic sensitive elements according to requirements.

Further, the magnetic sensitive element sorting module 3 further comprises a placing module 34, a positioning module 35 and a waste collecting module 36; the placing module 34 is configured to place the magnetic sensitive elements taken out by the pick-up module 32, the positioning module 35 is configured to position the magnetic sensitive elements on the placing module 34, and the waste collecting module 36 is located behind the measuring and screening module 33 and is configured to collect the unqualified magnetic sensitive elements after being measured and screened.

After the pick-up module 32 takes the magnetic sensitive element out of the suspension module 31, the magnetic sensitive element needs to be placed in the placing module 34. The placing module 34 can be a funnel-shaped structure, which can be used to place the magnetic sensitive element and adjust the position of the magnetic sensitive element at the same time. The positioning module 35 positions the magnetic sensitive element to facilitate the measuring and screening module 33 to measure the magnetic sensitive element subsequently, thus ensuring higher and more accurate measuring and screening accuracy. the positioning module 35 positions the magnetic sensitive element, which can also improve the precision and accuracy of measuring and screening. After the magnetic sensitive element is measured and screened by the measuring and screening module 33, some unqualified products will be produced, which cannot be conveyed to the pin processing module 4 for processing. Therefore, the waste collecting module 36 is provided, which can store the unqualified magnetic sensitive elements after being measured and screened, and avoid the unqualified magnetic sensitive elements from being transferred to the next process and resulting in unqualified final products. The collected unqualified magnetic sensitive elements can also be reworked uniformly.

Further, the suspension module 31 comprises two magnet boxes which are parallel to each other and provided at intervals, permanent magnets are provided in the magnet boxes, and the magnetism inside the permanent magnets is in an irregular and uneven state.

Two magnet boxes are provided in the vertical or horizontal direction. There are permanent magnets in the magnet boxes. The permanent magnets are used to make the magnetic sensitive element in the vertical or horizontal position (because there are two metal pins at both ends of the magnetic sensitive element, the permanent magnets use magnetism to attract the two metal pins to make the magnetic sensitive element in the vertical or horizontal position and in the suspended state). The magnetism inside the permanent magnet is in an irregular and uneven state, that is, the magnetism is not gradually decreasing or gradually increasing or regularly distributed along a certain direction. The magnetism in the permanent magnet is arranged irregularly, which can prevent the magnetic sensitive elements from gathering, make the magnetic sensitive elements more diffuse, and facilitate the pick-up module 32 to pick up materials.

Further, the whole-process digital processing system of a magnetic switch sensor further comprises a sorting and conveying module 13 which is in data connection with the master control module 1, wherein the sorting and conveying module 13 is configured to convey the magnetic sensitive element sorted by the magnetic sensitive element sorting module 3 to the pin processing module 4; the sorting and conveying module 13 comprises at least two conveying belts, each conveying belt is configured to convey magnetic sensitive elements classified into different grades after being sorted, and each conveying belt is provided with a plurality of neck stations for erecting magnetic sensitive elements.

After being measured and screened, the magnetic sensitive element will be classified into qualified products and unqualified products according to the quality, and the qualified products will be subdivided into several quality grades. At least one conveying belt corresponds to the magnetic sensitive element of each quality grade, and each conveying belt correspondingly conveys the magnetic sensitive elements of the same quality grade. For example, if qualified magnetic sensitive elements are classified into five grades of ABCDE according to the quality, the sorting and conveying module 13 can be specifically provided with five conveying belts. The measuring and screening module 33 measures and screens the magnetic sensitive elements. The master control module 1 can obtain the measuring and screening results and control the corresponding conveying belt to hold the magnetic sensitive elements or control the magnetic sensitive elements to be loaded to the corresponding conveying belt according to the results. Of course, in other embodiments, the number of conveying belts may be larger than the number of quality grades. For example, if each quality grade corresponds to two conveying belts, the number of conveying belts is ten. Alternatively, if the ABC quality grades correspond to two conveying belts and the DE quality grades correspond to one conveying belt, the number of conveying belts is eight. The specific number of conveying belts can be flexibly set according to the demand. At least two conveying belts are provided, so that qualified magnetic sensitive elements can be conveyed separately according to the quality grade to meet the demand of different orders. For example, if an order requires products with higher quality requirements, the corresponding conveying belts can convey the magnetic sensitive elements with higher quality after being measured and screened to the pin processing module 4 for processing, so that the manufactured magnetic sensitive elements can better meet the order demand. Orders of different grades (for example, some orders have higher quality requirements and some orders have lower quality requirements) are conveyed to the order module 2. The master control module 1 can also sort and combine orders, so that a batch of magnetic sensitive elements can meet the production of multiple orders. Therefore, the production efficiency is higher, the material utilization rate is higher, and the order coordination is better. On the other hand, each conveying belt is provided with a plurality of neck stations, and each neck station can be erected with a magnetic sensitive element. The neck station is provided, which can ensure the stability of the magnetic sensitive element during the conveying process, make the magnetic sensitive element flow to the pin processing module 4 orderly, and facilitate the pin processing module 4 to process the magnetic sensitive element.

Further, the pin processing module 4 comprises a positioning structure 41, a shearing structure 42 and a bending structure 43; the positioning structure 41 is configured to position the magnetic sensitive element, the shearing structure 42 is configured to shear the pins of the magnetic sensitive element, and the bending structure 43 is configured to bend the pins of the magnetic sensitive element.

The magnetic sensitive element conveyed to the pin processing module 4 by the sorting and conveying module 13 is first positioned by the positioning structure 41 to facilitate subsequent shearing and/or bending processing. The shearing structure 42 can shear the pins of the magnetic sensitive element according to the shearing requirements, and the bending structure 43 can bend the pins of the magnetic sensitive element. In different orders, some orders need to shear the pins of the magnetic sensitive element, some orders need to bend the pins of the magnetic sensitive element, and some orders need to shear and bend the pins of the magnetic sensitive element. Therefore, the pin processing module 4 is provided with the shearing structure 42 and the bending structure 43 to meet the processing demand of different orders or different processing demands of the same order.

Further, the whole-process digital processing system of a magnetic switch sensor further comprises a packaging module 14, wherein the packaging module 14 is configured to package the magnetic switch sensor graded by the grading module 12, and finally realize the completion of the order.

Further, the whole-process digital processing system of a magnetic switch sensor further comprises a data visualization module which is in data connection with the master control module 1. The data visualization module can display various data in the production process, such as order information, inventory information, processing information, order completion information, early warning information, etc. through the display screen. The display mode can be text, graphics, tables, etc. The data visualization module can display various information, which is convenient for workers to understand the production process. Moreover, various data can be analyzed to improve the production process.

Embodiment 2

Figure 2:
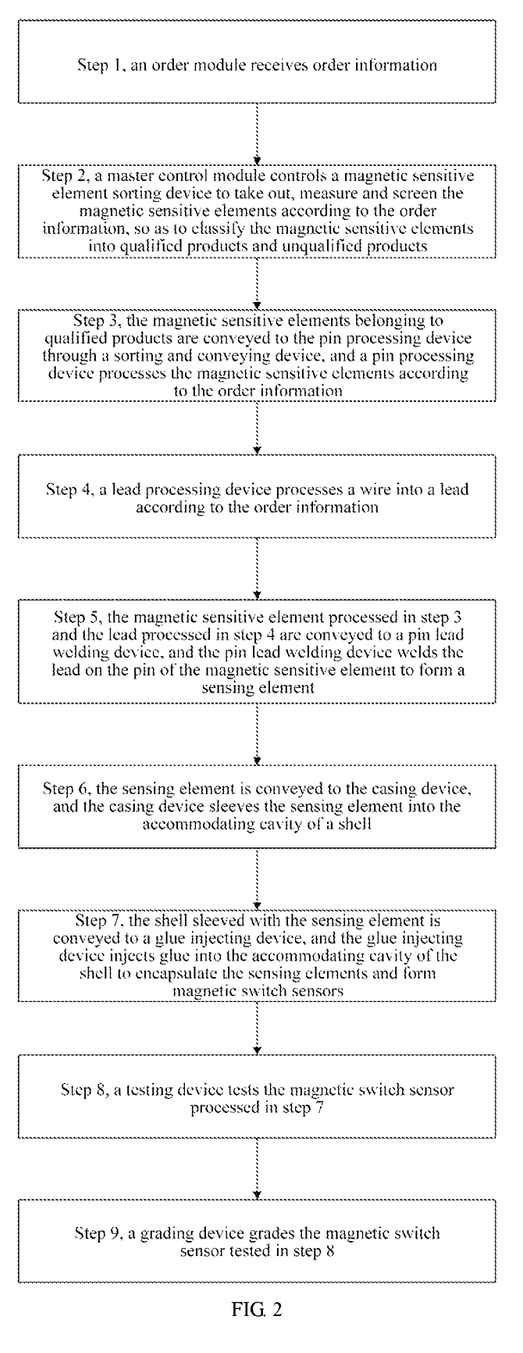
FIG. 2 is a schematic diagram of the step processes of a processing method according to the present disclosure.

As shown in FIG. 2, on the other hand, the present disclosure further provides a whole-process digital processing method of a magnetic switch sensor, comprising the following steps:

step 1, an order module 2 receives order information;

step 2, a master control module 1 controls a magnetic sensitive element sorting device to take out, measure and screen the magnetic sensitive elements according to the order information, so as to classify the magnetic sensitive elements into qualified products and unqualified products;

step 3, the magnetic sensitive elements belonging to qualified products are conveyed to the pin processing device through a sorting and conveying device, and a pin processing device processes the magnetic sensitive elements according to the order information;

step 4, a lead processing device processes a wire into a lead according to the order information;

step 5, the magnetic sensitive element processed in step 3 and the lead processed in step 4 are conveyed to a pin lead welding device, and the pin lead welding device welds the lead on the pin of the magnetic sensitive element to form a sensing element;

step 6, the sensing element is conveyed to the casing device, and the casing device sleeves the sensing element into the accommodating cavity of a shell;

step 7, the shell sleeved with the sensing element is conveyed to a glue injecting device, and the glue injecting device injects glue into the accommodating cavity of the shell to encapsulate the sensing elements and form magnetic switch sensors.

Further, step 1-2 is further included between step 1 and step 2: a database module 9 conveys inventory information to the master control module 1, the master control module 1 calculates purchasing information according to the order information and the inventory information and conveys the purchasing information to the purchasing information output module 10, and then the purchasing information output module 10 sends the purchase information to the purchasing staff, and the inventory information comprises magnetic sensitive element inventory data, wire inventory data, shell inventory data and colloidal particle inventory data.

Further, the whole-process digital processing method of a magnetic switch sensor further comprises the following steps:

step 8, a testing device tests the magnetic switch sensor processed in step 7;

step 9, a grading device grades the magnetic switch sensor tested in step 8.

Further, in step 8, the testing device feeds back the test result to the master control module 1; in step 9, the grading device feeds back the grading result to the master control module 1; the master control module 1 adjusts the operation of the magnetic sensitive element sorting device, the pin processing device, the lead processing device, the pin lead welding device, the casing device and the glue injecting device in combination with the order information, the test result and the grading result, so as to process all orders according to the order information.

Further, the machine learning module in the master control module 1 carries out machine learning and builds a machine learning model in combination with the order information, the test result and the grading result, and combines and adjusts subsequent orders according to the machine learning model.

Further, the magnetic sensitive element sorting device comprises a suspension device, a pick-up device and a measuring and screening device, wherein step 2 comprises:

step 2.1, the master control module 1 receives the order information and controls the pick-up device to take out the magnetic sensitive elements from the suspension device in sequence;

step 2.2, the measuring and screening device measures and screens the magnetic sensitive elements, and classifies the magnetic sensitive elements into qualified products and unqualified products.

Further, the magnetic sensitive element sorting device further comprises a placing device, a positioning device and a waste collecting device; the following steps are further included between step 2.1 and step 2.2:

step 2.1-1, the pick-up device places the magnetic sensitive element in the placing device;

step 2.1-2, the positioning device positions the magnetic sensitive element in the placing device;

step 2.2 is followed by step 2.3, if the magnetic sensitive element fails after being measured and screened, the unqualified magnetic sensitive element flows into the waste collecting device.

Further, in step 2.2, the qualified products are divided into n grades, where n≥2; in step 3, the sorting and conveying device comprises m conveying belts, wherein m≥n; the qualified products of each grade are conveyed to the pin processing device by at least one conveying belt correspondingly.

Further, in step 2, the sorting and conveying device further comprises a switching mechanism, and the switching mechanism is configured to switch the conveying belt so that the corresponding conveying belt is switched to the output end of the measuring and screening device to hold the graded magnetic sensitive element.

Referring to Embodiment 1, the magnetic sensitive element can be loaded into a specific conveying belt through the movement of the sorting and conveying device. Alternatively, the conveying belt can hold the magnetic sensitive element of the corresponding quality grade through the movement of a specific conveying belt. In this embodiment, specifically, the position of the conveying belt is switched by providing a switching mechanism, so that the measured and screened magnetic sensitive element can be loaded to the corresponding conveying belt. In other embodiments, a transfer conveying belt can be further provided, so that the input end of the transfer conveying belt is located at the right lower end of the output end of the measuring and screening device, and the output end of the transfer conveying belt can be communicated with the input ends of a plurality of conveying belts. Moreover, switching can be performed among a plurality of conveying belts, so that the magnetic sensitive element after being measured and screened can first pass through the transfer conveying belt and then be conveyed to the conveying belt for conveying the workpiece to the processing device.

Further, each conveying belt is provided with a plurality of neck stations for erecting magnetic sensitive elements.

Further, the suspension device comprises two magnet boxes which are parallel to each other and provided at intervals, permanent magnets are provided in the magnet boxes, and the magnetism inside the permanent magnets is in an irregular and uneven state.

Further, in step 1, the order information comprises order number, number of workpieces, order grade and processing demand; the processing demand includes whether to shear the pin, whether to bend the pin, the shearing length of the pin and the length of the lead;

in step 3, the pin processing device comprises a shearing structure 42 and a bending structure 43, the shearing structure 42 is configured to shear the pin of the magnetic sensitive element, and the bending structure 43 is configured to bend the pin of the magnetic sensitive element;

in step 4, the lead processing device peels the wire and cuts out the lead from the wire.

The whole-process digital processing method of a magnetic switch sensor according to this embodiment is a method for producing a magnetic switch sensor using the digital processing system as described above, which is another manifestation of the present disclosure. The order module 2, the master control module 1, the magnetic sensitive element sorting device, the sorting and conveying device, the pin processing device, the lead processing device, the pin lead welding device, the casing device, the glue injecting device, the database module 9, the purchasing information output module 10, the testing device, the grading device, the machine learning module, the suspension device, the pick-up device, the measuring and screening device, the placing device, the positioning device and the waste collecting device described in the digital processing method correspond to the order module 2, the master control module 1, the magnetic sensitive element sorting module 3, the sorting and conveying module 13, the pin processing module 4, the lead processing module 5, the pin and lead welding module 6, the casing module 7, the glue injecting module 8, the database module 9, the purchasing information output module 10, the testing module 11, the grading module 12, the machine learning module, the suspension module 31, the pick-up module 32, the measuring and screening module 33, the placing module 34, the positioning module 35, and the waste collecting module 36 in the digital processing system, respectively. The shearing structure 42, the bending structure 43 and the positioning structure 41 in the pin processing device also correspond to each other. The lead processing device correspondingly comprises a shearing structure and a peeling structure. The magnetic switch sensor graded in step 9 is packaged by a packaging device. The packaging device corresponds to the packaging module 14 in Embodiment 1. The digital processing method uses a digital processing system. For detailed description, refer to the related contents of Embodiment 1, which will not be described in detail here.

A batch of orders are produced by a digital processing system and a digital processing method hereinafter, which will be analyzed as a specific implementation method. First, magnetic sensitive elements are classified into qualified products and unqualified products according to the quality, among which qualified products are subdivided into five quality grades of ABCDE according to the quality, in which grade A has the highest quality. The order also classifies the quality of magnetic switch sensors into qualified products and unqualified products. In theory, magnetic switch sensors produced with magnetic sensitive elements of ABCDE quality grade are also classified into five quality grades of ABCDE, on the premise of excluding the influence of the production process on the workpiece. The specific processing method is as follows.

Step 1, the order module 2 receives order information, including three orders PO1, PO2 and PO3. PO1 requires 1000 magnetic switch sensors, and the quality grade requirements are grade A and grade B. The pins at both ends of the magnetic sensitive element need to be sheared by 10 mm. PO2 requires 1,000 magnetic switch sensors, and the quality requirements are grade B, grade C and grade D. The pins at both ends of the magnetic sensitive element need to be bent. PO3 requires 1000 magnetic switch sensors, and the quality grade requirements are grade D and grade E. The left pin of the magnetic sensitive element needs to be sheared by 15 mm, and the right pin of the magnetic sensitive element needs to be bent. Insulated wires are used as wires for producing leads, PO1, PO2 and PO3 require leads to be peeled and cut to a length of 50 mm, and the pins at both ends of each magnetic sensitive element need to be welded with a lead of 50 mm.

Material preparation: the staff will load a batch of magnetic sensitive elements (the number should be greater than the total number of workpieces required by PO1, PO2 and PO3 orders, such as 3500 pieces) to the suspension device, the permanent magnets in two magnet boxes absorb the pins at both ends of the magnetic sensitive elements, and the magnetic sensitive elements are suspended between the two magnet boxes.

Step 1-2, the master control module 1 calculates the types and quantities of materials to be purchased according to the order information and the inventory information in the database module 9, and sends these purchasing information to the staff responsible for purchasing through the purchasing information output module 10. Step 1-2 can be executed simultaneously with step 2.1.

Step 2.1, the master control module 1 controls the pick-up device to take out the magnetic sensitive elements from the mounting, one at a time.

Step 2.1-1, the pick-up device transfers the magnetic sensitive element to the right above the placing device by rotating or turning over, and then the magnetic sensitive element is released so as to fall into the placing device.

Step 2.1-2, the positioning device positions the magnetic sensitive element in the placing device.

Step 2.2, the measuring and screening device measures and screens the magnetic sensitive elements, and classifies the magnetic sensitive elements into unqualified products, grade A, grade B, grade C, grade D or grade E according to the results.

Step 2.3, if the product is unqualified, the magnetic sensitive element is loaded into a waste collecting device. If it is qualified, proceed to the next step.

Step 3, the sorting and conveying device comprises A conveyer belt, B conveyer belt, C conveyer belt, D conveyer belt, E conveyer belt and a switching mechanism, wherein A conveyer belt, B conveyer belt, C conveyer belt, D conveyer belt and E conveyer belt are configured to hold and convey A-grade magnetic sensitive elements, B-grade magnetic sensitive elements, C-grade magnetic sensitive elements, D-grade magnetic sensitive elements and E-grade magnetic sensitive elements, respectively. Assume that the first magnetic sensitive element belongs to grade A, and the switching mechanism switches A conveying belt to the output end of the measuring and screening device, so that A conveying belt holds the first magnetic sensitive element, and the first magnetic sensitive element is erected at the neck station on A conveying belt. The second workpiece belongs to the B-grade magnetic sensitive element, and the switching mechanism moves A conveying belt and switches B conveying belt to the output end of the measuring and screening device. B conveying belt holds the second magnetic sensitive element and makes the second magnetic sensitive element be erected on the neck station on B conveying belt. Assume that there are 600 pieces in grade A, 800 pieces in grade B, 700 pieces in grade C, 600 pieces in grade D, 600 pieces in grade E and 200 pieces of unqualified products. Each conveying belt is provided with at least 1000 neck stations, and each neck station can be erected with a magnetic sensitive element.

The pin processing device processes the magnetic sensitive element according to the order information. First, PO1 is processed, and the master control module 1 first controls A conveying belt to convey magnetic sensitive elements to the pin processing device (one magnetic sensitive element at a time). The positioning structure 41 in the pin processing device first positions the magnetic sensitive elements. The shearing structure 42 cuts the pins at the left and right ends of the magnetic sensitive elements by 10 mm, and then transfers the pins to the pin lead welding device. After the A-grade magnetic sensitive element on A conveying belt is processed, the master control module 1 controls B conveying belt to convey the magnetic sensitive element to the pin processing device. The pin processing device cuts the pins at the left and right ends of the magnetic sensitive element by 10 mm, and then transfers the pins to the pin lead welding device. B conveying belt only needs to convey 400 magnetic sensitive elements to the pin processing device. The magnetic sensitive elements are transferred to the pin lead welding device after each magnetic sensitive element is processed by the pin processing device.

Next, PO2 is processed. The master control module 1 first controls B conveying belt to convey the remaining B-grade magnetic sensitive elements to the pin processing device. The positioning structure 41 in the pin processing device first positions the magnetic sensitive element, and then the bending structure 43 bends the pins at the left and right ends of the magnetic sensitive element, and transfers the pins to the pin lead welding device. When the magnetic sensitive elements on B conveying belt are processed, the pin processing device delivers 400 magnetic sensitive elements to the pin lead welding device. Then, the master control module 1 controls C conveying belt to convey C-grade magnetic sensitive elements to the pin processing device. The pin processing device processes 600 C-grade magnetic sensitive elements in sequence, then transfers the elements to the pin lead welding device after processing, and conveys 1,000 magnetic sensitive elements to the pin lead welding device. All of the magnetic sensitive elements belong to grade B and grade C. At this time, there are 100 magnetic sensitive elements left in C conveying belt.

Finally, PO3 is processed. The master control module 1 first controls D conveying belt to convey the D-grade magnetic sensitive elements to the pin processing device. The positioning structure 41 in the pin processing device first positions the magnetic sensitive element, the shearing structure 42 then cuts the pin at the left side of the magnetic sensitive element by 15 mm, and the bending structure 43 bends the pin at the right side of the magnetic sensitive element. After processing, the pin is transferred to the pin lead welding device. When the magnetic sensitive elements on D conveying belt are processed, the pin processing device transfers 600 magnetic sensitive elements to the pin lead welding device. Then, the master control module 1 controls E conveying belt to convey E-grade magnetic sensitive elements to the pin processing device. The pin processing device processes the magnetic sensitive element. The E conveying belt only needs to convey 400 magnetic sensitive elements to the pin processing device. After the pin processing device finishes processing the magnetic sensitive elements, the pin lead welding device will convey 1000 magnetic sensitive elements to the pin lead device, and all the magnetic sensitive elements belong to grade D and grade E.

After finishing the processing of PO1, PO2 and PO3, there are still 100 workpieces left in C conveying belt and 200 workpieces left in E conveying belt. When the next batch of orders are to be produced, if the quality grade of the orders requires grade C and grade E, the workpieces on C conveying belt and E conveying belt should be used first.

Step 4, while executing the above steps, the master control module 1 controls the lead processing device to process the wires into leads according to the order information, that is, step 4 can be performed synchronously with step 2 and step 3. Specifically, the peeling structure peels off the insulation layer on the wire, and the shearing result cuts out the lead of 50 mm from the wire. The length of a coil of wire can be as high as 20000 mm. While the insulation layer is stripped, the lead is cut, but the length of the wire stripped of the insulation layer should be greater than 50 mm before cutting.

Step 5, one magnetic sensitive element processed in step 3 is transferred to the pin lead welding device, and the leads processed in step 4 are also synchronously transferred to the pin lead welding device. One magnetic sensitive element corresponds to two leads. The pin lead welding device welds a lead on two pins of the magnetic sensitive element to form a sensing element.

Step 6, the sensing element processed in step 5 is transferred to the casing device, in which a shell is stored. The manipulator in the casing device inserts the sensing element into the accommodating cavity of the shell, so that the part of the magnetic element is completely located in the accommodating cavity, a part of the leads is located in the accommodating cavity, and a part of the leads extend out of the accommodating cavity.

Step 7, the shell with the sensing element is transferred to the glue injecting device, the glue injecting device heats the glue particles into molten glue, and then the glue is injected into the accommodating cavity by the glue injecting mechanism of the glue injecting device. The injection amount of the glue is controlled to fill the accommodating cavity. After the glue is cooled and solidified, the shell, the sensing element and the glue become an integrated structure, and the part of the sensing element in the accommodating cavity is completely wrapped by the glue, and finally the magnetic switch sensor is formed.

Step 8, the magnetic switch sensor is transferred to the testing device. The testing device is a measuring instrument, and the electrodes (two leads) are connected to the measuring instrument to complete the performance test and judgment of the finished magnetic switch sensor. For example, when PO1 is produced, whether the magnetic switch sensor meets the quality grade requirements of grade A and grade B can be judged by testing.

Step 9, the grading device grades the magnetic switch sensors tested in step 8. For example, when PO1 is produced, it is found that 10 magnetic switch sensors that should be classified as PO1 cannot reach grade B (for example, classified as grade C), so that it is necessary to add 10 magnetic switch sensors with grade B or above to PO1. This can be done by first taking 10 magnetic switch sensors with grade B from PO2 and adding them to PO1. Alternatively, after the orders of PO1, PO2 and PO3 are produced, the gaps of PO1, PO2 and PO3 should be filled first, and then the next batch of orders are produced. The magnetic switch sensor is packaged according to the order, and the production of PO1, PO2 and PO3 is completed.

In the production process, the testing device and the grading device feed back the test result and grading result to the master control module. The master control module adjusts the processing system according to the information to supplement the gap of orders. At the same time, the machine learning module carries out machine learning and builds a machine learning model in combination with the order information, the test result and the grading result, and combines and adjusts subsequent orders according to the machine learning model.

What has been described above is only the preferred embodiment of the present disclosure, rather than limit the patent scope of the present disclosure. All equivalent structural changes made by using the contents of the description and drawings of the present disclosure or directly/indirectly applied in other related technical fields under the inventive concept of the present disclosure are included in the patent protection scope of the present disclosure.

What is claimed is:

1. A whole-process digital processing system of a magnetic switch sensor, comprising a master control module (1), an order module (2), a magnetic sensitive element sorting module (3), a pin processing module (4), a lead processing module (5), a pin lead welding module (6), a casing module (7) and a glue injecting module (8);
    wherein the order module (2) is configured to convey order information to the master control module (1);
    wherein the master control module (1) is configured to control operation of the magnetic sensitive element sorting module (3), the pin processing module (4), the lead processing module (5), the pin lead welding module (6), the casing module (7) and the glue injecting module (8);
    wherein the magnetic sensitive element sorting module (3) is configured to grade and screen magnetic sensitive elements, wherein the pin processing module (4) is configured to process pins of magnetic sensitive elements, wherein the lead processing module (5) is configured to process wires into leads, wherein the pin lead welding module (6) is configured to weld leads on the pins of magnetic sensitive elements to form sensing elements, wherein the casing module (7) is configured to sleeve the sensing elements into the accommodating cavity of a shell, and wherein the glue injecting module (8) is configured to inject glue into the accommodating cavity of the shell to encapsulate the sensing elements and form magnetic switch sensors.

2. The whole-process digital processing system of a magnetic switch sensor according to claim 1, further comprising a database module (9) and a purchasing information output module (10), wherein the database module (9) is configured to convey inventory information to the master control module (1), wherein the master control module (1) calculates purchasing information in combination with the order information and the inventory information and conveys the purchasing information to the purchasing information output module (10), wherein the purchasing information output module (10) is configured to output the purchasing information, and wherein the inventory information further comprising magnetic sensitive element inventory data, wire inventory data, shell inventory data and colloidal particle inventory data.

3. The whole-process digital processing system of a magnetic switch sensor according to claim 1, further comprising a testing module (11) and a grading module (12), wherein the testing module (11) is configured to test the processed magnetic switch sensors, and the grading module (12) is configured to grade the tested magnetic switch sensors.

4. The whole-process digital processing system of a magnetic switch sensor according to claim 3, wherein the testing module (11) and the grading module (12) each further comprising a feedback module, wherein the feedback module is configured to send a test result and a grading result to the master control module (1); wherein the master control module (1) adjusts the operation of the magnetic sensitive element sorting module (3), the pin processing module (4), the lead processing module (5), the pin lead welding module (6), the casing module (7) and the glue injecting module (8) in combination with the order information, the test result and the grading result, and process all orders according to the order information; wherein the master control module (1) further comprising a machine learning module, wherein the machine learning module is configured to carry out machine learning and build a machine learning model in combination with the order information, the test result and the grading result, and wherein the master control module (1) combines and adjusts subsequent orders according to the machine learning model.

5. The whole-process digital processing system of a magnetic switch sensor according to claim 1, wherein the magnetic sensitive element sorting module (3) further comprising a suspension module (31), a pick-up module (32) and a measuring and screening module (33), wherein the suspension module (31) is configured to fix the magnetic sensitive element, and wherein the pick-up module (32) is configured to take out the magnetic sensitive element from the suspension module (31) and convey the magnetic sensitive element to the measuring and screening module (33), and wherein the measuring and screening module (33) is configured to measure and screen the magnetic sensitive element.

6. The whole-process digital processing system of a magnetic switch sensor according to claim 5, wherein the magnetic sensitive element sorting module (3) further comprising a placing module (34), a positioning module (35) and a waste collecting module (36); wherein the placing module (34) is configured to place the magnetic sensitive elements taken out by the pick-up module (32), wherein the positioning module (35) is configured to position the magnetic sensitive elements on the placing module (34), and wherein the waste collecting module (36) is located behind the measuring and screening module (33) and is configured to collect the unqualified magnetic sensitive elements; wherein the suspension module (31) further comprising two magnet boxes which are parallel to each other and provided at intervals, wherein permanent magnets are provided in the magnet boxes, and wherein the magnetism inside the permanent magnets is arranged in an irregular and uneven state.

7. The whole-process digital processing system of a magnetic switch sensor according to claim 1, further comprising a sorting and conveying module (13), wherein the sorting and conveying module (13) is configured to convey the magnetic sensitive element sorted by the magnetic sensitive element sorting module (3) to the pin processing module (4); wherein the sorting and conveying module (13) further comprising at least two conveying belts, each configured to convey magnetic sensitive elements classified into different grades after being sorted, and wherein each conveying belt is provided with a plurality of neck stations for erecting magnetic sensitive elements.

8. The whole-process digital processing system of a magnetic switch sensor according to claim 1, wherein the pin processing module (4) further comprising a positioning structure (41), a shearing structure (42) and a bending structure (43); wherein the positioning structure (41) is configured to position the magnetic sensitive element, wherein the shearing structure (42) is configured to shear the pins of the magnetic sensitive element, and wherein the bending structure (43) is configured to bend the pins of the magnetic sensitive element.

9. A whole-process digital processing method of a magnetic switch sensor, comprising the following steps:
receiving order information from an order module;
controlling a magnetic sensitive element sorting device with a master control module (1), to take out, measure and screen the magnetic sensitive elements according to the order information, so as to classify the magnetic sensitive elements into qualified products and unqualified products;
conveying the magnetic sensitive elements belonging to qualified products to the pin processing device through a sorting and conveying device, and a pin processing device processes the magnetic sensitive elements according to the order information;
processing a wire with a lead processing device processes-a-wire-into a lead according to the order information;
conveying the processed magnetic sensitive element and the processed lead to a pin lead welding device, and the pin lead welding device welds the lead on the pin of the magnetic sensitive element to form a sensing element;
conveying the sensing element to the casing device, and the casing device sleeves the sensing element into the accommodating cavity of a shell;
conveying the shell to a glue injecting device, and the glue injecting device injects glue into the accommodating cavity of the shell to encapsulate the sensing elements and form magnetic switch sensors.

10. The whole-process digital processing method of a magnetic switch sensor according to claim 9, further comprising: a database module (9) conveying inventory information to a master control module (1), the master control module (1) calculating purchasing information according to the order information and the inventory information and conveying the purchasing information to a purchasing information output module (10), and then the purchasing information output module (10) sending the purchase information to the purchasing staff, and the inventory information comprises magnetic sensitive element inventory data, wire inventory data, shell inventory data and colloidal particle inventory data.

11. The whole-process digital processing method of a magnetic switch sensor according to claim 10, further comprising the following steps:
testing the magnetic switch sensor by a testing device;
grading the magnetic switch sensor by a grading device.

12. The whole-process digital processing method of a magnetic switch sensor according to claim 11, wherein the testing device sends the test result to the master control module (1); the grading device sends the grading result to the master control module (1); the master control module (1) adjusts the operation of the magnetic sensitive element sorting device, the pin processing device, the lead processing device, the pin lead welding device, the casing device and the glue injecting device in combination with the order information, the test result and the grading result, to process all orders according to the order information.

13. The whole-process digital processing method of a magnetic switch sensor according to claim 12, wherein a machine learning module in the master control module (1) carries out machine learning and builds a machine learning model in combination with the order information, the test result and the grading result, and combines and adjusts subsequent orders according to the machine learning model.

14. The whole-process digital processing method of a magnetic switch sensor according to claim 9, wherein the magnetic sensitive element sorting device a suspension device, a pick-up device and a measuring and screening device, wherein the controlling of the magnetic sensitive element sorting device further comprises: receiving the order information by master control module (1) and controlling the pick-up device to take out the magnetic sensitive elements from the suspension device in sequence;

measuring and screening the magnetic sensitive elements by the measuring and screening device, and classifying the magnetic sensitive elements into qualified products and unqualified products.

15. The whole-process digital processing method of a magnetic switch sensor according to claim 14, wherein the magnetic sensitive element sorting device further comprises a placing device, a positioning device and a waste collecting device; wherein:
- the pick-up device places the magnetic sensitive element in the placing device,
- the positioning device positions the magnetic sensitive element in the placing devices, and
- if the magnetic sensitive element fails after being measured and screened, the unqualified magnetic sensitive element flows into the waste collecting device.

16. The whole-process digital processing method of a magnetic switch sensor according to claim 14, wherein the qualified products are divided into n grades, where n≥2; the sorting and conveying device comprises m conveying belts, wherein m≥n; the qualified products of each of the n grades are conveyed to the pin processing device by at least one of the m conveying belts.

17. The whole-process digital processing method of a magnetic switch sensor according to claim 16, wherein the sorting and conveying device further comprising a switching mechanism, and the switching mechanism is configured to switch the conveying belt so that the corresponding conveying belt is switched to the output end of the measuring and screening device to hold the graded magnetic sensitive element.

18. The whole-process digital processing method of a magnetic switch sensor according to claim 16, wherein each of the m conveying belts is provided with a plurality of neck stations for erecting magnetic sensitive elements.

19. The whole-process digital processing system of a magnetic switch sensor according to claim 14, wherein the suspension device comprises two magnet boxes which are parallel to each other and provided at intervals, permanent magnets are provided in the magnet boxes, and the magnetism inside the permanent magnets is in an irregular and uneven state.

20. The whole-process digital processing system of a magnetic switch sensor according to claim 9, wherein the order information further comprises: an order number, a number of workpieces, an order grade, and a processing demand, wherein the processing demand includes whether to shear the pin, or bend the pin, to provide a shearing length of the pin and a length of the lead,
- wherein the pin processing device comprises a shearing structure (42) and a bending structure (43), the shearing structure (42) configured to shear the pin of the magnetic sensitive element, and the bending structure (43) configured to bend the pin of the magnetic sensitive element, and
- wherein the lead processing device peels the wire and cuts out the lead from the wire.

* * * * *